Jan. 3, 1956 F. N. BRAUER 2,729,742

PULSE-OPERATED TIMING CIRCUIT

Filed Oct. 19, 1950

INVENTOR.
FREDERICK N. BRAUER
BY
Brown, Denk & Synnestvedt
AGENTS

United States Patent Office 2,729,742

Patented Jan. 3, 1956

2,729,742

PULSE-OPERATED TIMING CIRCUIT

Frederick N. Brauer, Jenkintown, Pa., assignor to Philco Corporation, Philadelphia, Pa., a corporation of Pennsylvania Application October 19, 1950, Serial No. 190,984

4 Claims. (Cl. 250—27)

Figure 1:
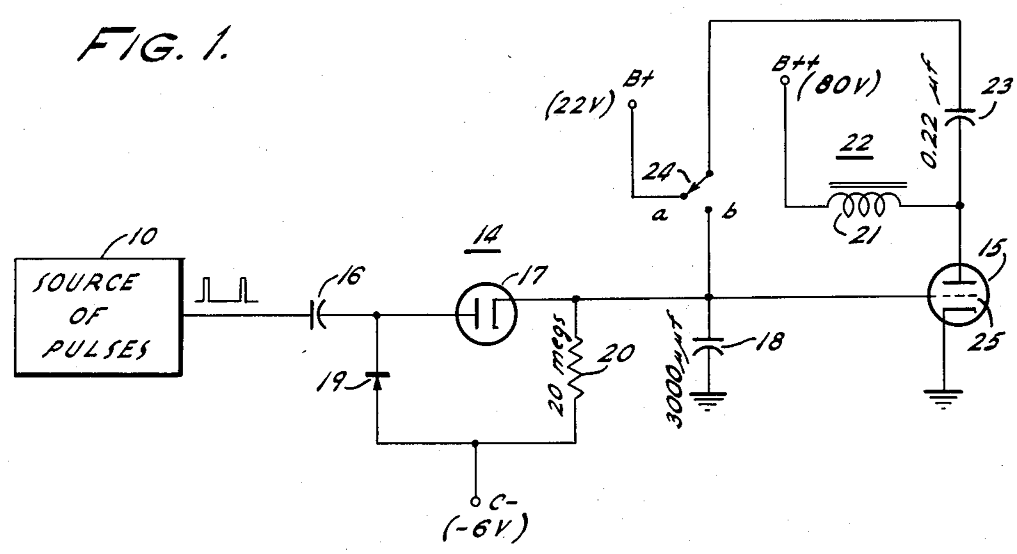

The invention herein described and claimed relates to a new pulse-operated timing circuit.

The new circuit is particularly adapted for use in sonobuoy or other unattended pulse-triggered equipment of the local-battery type where it is important that battery power be conserved.

A principal object of the present invention is to provide a circuit which is normally inactive so as to conserve battery power but is capable of being activated in response to and within an extremely short period of time following application of the first of a small number of trigger pulses and capable, after activation, of remaining operative for a relatively long period of time following the final trigger pulse.

A more specific object of the invention is to provide a circuit of the foregoing type which is capable of being activated by a small number of extremely short pulses, as for example, pulses of two or three microseconds' duration.

In accordance with a preferred embodiment of the present invention, the above objects are achieved by an arrangement which employs an amplifier tube normally biased beyond cutoff to conserve the battery, a grid-cathode capacitor of sufficiently small size that in response to applied trigger pulses of very short duration, say two or three microseconds, a voltage may be rapidly developed across the capacitor sufficient in magnitude to drive the tube into conduction, and relay means in the output circuit of the tube for effecting connection between the grid and plate of the tube, after the tube conducts, of a physical capacitor whose value is preferably many times larger than the grid-plate interelectrode capacitance of the tube. The tube then functions as a special type of Miller amplifier, the effective grid-cathode capacitance of the tube being many times larger than it was before the tube conducted and many times larger than it would have been had the relatively large grid-plate capacitor not been connected.

With the arrangement described above, when the tube is conducting, the discharge time constant of the grid circuit of the tube is very long, being approximately equal to $RC_{gp}A$, where R is the value of the discharge resistor, $C_{gp}$ is the value of the relatively large physical grid-plate capacitor, and A is the gain of the tube.

Ordinarily, to obtain a very long time constant, both R and C should be large. In the present application, the discharge resistor is not in the charging path of the grid-cathode capacitor and this resistor may be made as large in value as is practical. The grid-cathode capacitor, however, must be kept small in order to keep the charging time short. And, as a practical matter, the effective value of R is limited by leakage paths which shunt the resistor. As a result, it is not practical, in the absence of the present invention, to obtain a discharge time constant for the grid circuit which is long enough for the purpose intended. By the present invention, the discharge time constant of the grid circuit is increased tremendously by increasing the capacitance factor C in the discharge RC time constant. The charge RC time constant is undisturbed and remains short.

Figure 2:
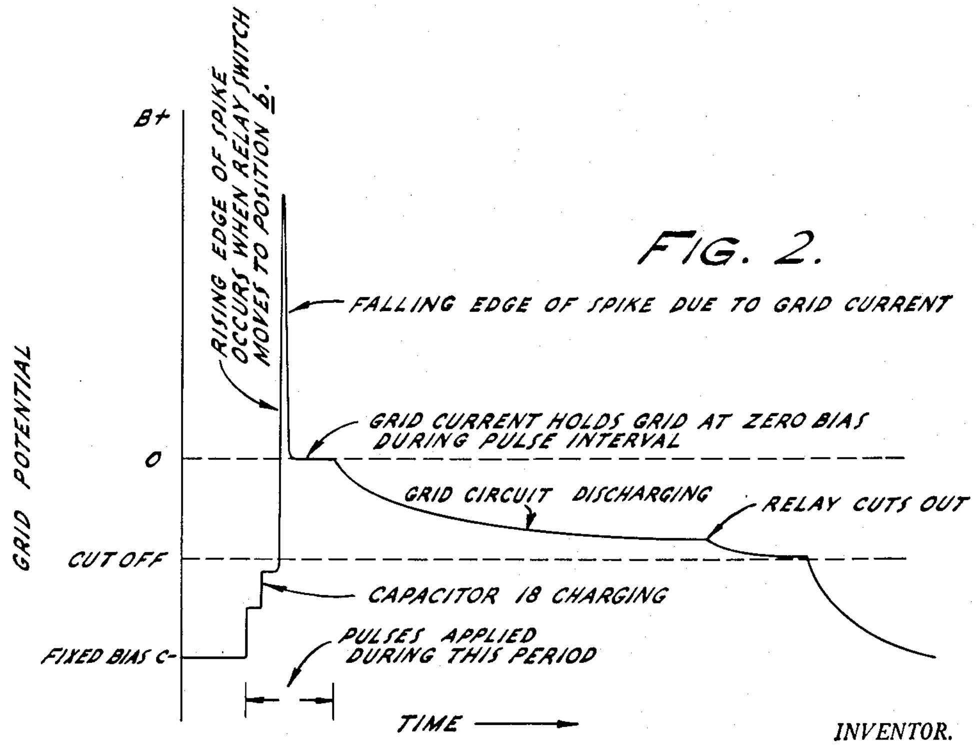

In the drawing which forms a part of this specification, Figure 1 is a schematic representation of a preferred embodiment of the invention, and Figure 2 is a graphical representation which will be helpful in explaining and understanding the invention.

In Figure 1 there is shown a source 10 of very short positive pulses, say two or three miscrosecond pulses, an integrating circuit 14, to which the pulses from source 10 are applied, and an amplifier tube 15 connected across the output of integrating circuit 14. The output circuit of amplifier tube 15 includes a relay 22 and a capacitor 23 whose functions will be described.

Integrating circuit 14 is of the counting circuit type and is largely conventional. It comprises a coupling capacitor 16, a diode 17, a storage capacitor 18, a crystal rectifier 19 whose function is to discharge coupling capacitor 16 between pulses, and a discharge resistor 20 for discharging storage capacitor 18. A source of fixed negative direct-current voltage, C—, is provided for biasing amplifier tube 15 beyond cutoff. The bias is applied by way of resistor 20. Capacitors 16 and 18 function as a voltage divider and, in response to the applied pulses from source 10, a voltage is built up across storage capacitor 18 in well-known step-by-step fashion. The discharge resistor 20 is preferably made as large in value as is practical.

Connected in the plate circuit of amplifier tube 15 is the winding 21 of a relay 22. A capacitor 23 is connected between the plate of tube 15 and the pivot end of a switch 24 of relay 22. As indicated in Figure 1, switch 24 is movable from contact point *a* to contact point *b*. When the relay is not energized, the switch 24 is at point *a*. Point *a* is preferably connected to a source of fixed positive direct-current voltage, B+, but need not be connected to anything. Or, point *a* may be connected to ground, though this is less desirable.

When relay 22 is energized, switch 24 moves to contact point *b*, thereby connecting capacitor 23 between the plate and grid of tube 15.

The manner in which the circuit of Figure 1 operates will now be described. Assume that no pulses have been delivered by source 10 for an extended period of time. Tube 15 is in non-conductive state, being biased beyond cut-off by the fixed negative direct-current voltage, C—, applied to its grid 25 by way of resistor 20, and capacitor 18 is charged to the negative voltage, C—. Relay 22 is in non-energized condition and switch 24 is at point *a*. In the preferred embodiment, with switch 24 at point *a*, the potential of the switch side of capacitor 23 is the same as that of the fixed positive direct-current voltage, B+, and the potential of the plate side of capacitor 23 is the same as that of the plate of tube 15.

Assume now that a series of short, say 2.5 microsecond, pulses of positive polarity are delivered by source 10 at 2500 microsecond intervals. When the pulses from source 10 are applied to the circuit 14, a positive-going voltage is cumulated in well-known step-by-step fashion across storage capacitor 18 and the potential of grid 25 rises in a corresponding manner, as is indicated graphically in Figure 2. The cutoff potential of tube 15 is quickly reached, tube 15 conducts, the plate current through winding 21 of relay 22 is sufficient to actuate the relay, and switch 24 moves from position *a* to position *b*. When this occurs, capacitor 18 charges very rapidly toward the potential of the switch side of capacitor 23, i. e. toward a potential equal to the fixed positive voltage, B+, and grid 25 goes sharply positive as shown in Figure 2.

When grid 25 goes sharply positive grid current flows in tube 15 and the potential of grid 25 drops sharply to zero bias, i. e. to cathode or ground potential, as also shown in Figure 2. The potential of grid 25 then remains at or near zero bias during the period that additional pulses are being received from source 10, for grid current prevents the potential of grid 25 from going positive to any appreciable extent.

Following application of the final pulse, the potential of grid 25 drops very gradually as capacitor 18 discharges very slowly toward the fixed negative voltage, C−. After a relatively long period of time, the potential of the grid reaches a point where the plate current is insufficient to maintain relay 22 in energized position. The relay then cuts out, switch 24 returns to position *a*, and capacitor 23 becomes disconnected from the grid 25. When this occurs, the grid circuit discharges at a substantially increased rate until tube 15 stops conducting, after which the rate of discharge increases still further, all of which is shown graphically in Figure 2.

That rate of discharge of capacitor 18 is very slow during the period that capacitor 23 is connected between the grid and plate of tube 15 may be shown by the following relation:

$$T=R_{20}[C_{18}+C_{23}(1+A)]$$

where T is the discharge time constant of the grid circuit when the tube is conducting and capacitor 23 is connected between grid and plate; $R_{20}$, $C_{18}$, and $C_{23}$ are the values, respectively, of resistor 20, capacitor 18, and capacitor 23; and A is the gain of tube 15.

The above relation may, of course, be rewritten as follows:

$$T=R_{20}[C_{18}+C_{23}+C_{23}A]$$

And, since A is large compared with 1, the terms $C_{18}$ and $C_{23}$ are small in comparison with the product $C_{23}A$. Hence, for an approximation, the above expression may be reduced to the following:

$$T=R_{20}(C_{23}A)$$

The above equation tells us that during the period that tube 15 is conducting and capacitor 23 is connected between the grid and plate of tube 15, the discharge time constant of the grid circuit is approximately equal to the value of resistor 20 multiplied by the value of capacitor 23 multiplied by the gain of the tube.

To obtain a very long discharge time constant, capacitor 23 is made much larger than capacitor 18. For example, capacitor 23 may be of the order of from fifty to one hundred times as large as capacitor 18. And, since the gain of the tube may be a number of the order of from twenty to several hundred, it will be seen that the product $C_{23}A$ will be many times larger than $C_{18}$. Hence, by means of the present invention, the capacitance factor in the discharge RC time constant may be made many times larger than it would have been had the invention not been employed. Stated another way, the rate of discharge of capacitor 18 is made many times slower than could have been accomplished, as a practical matter, by employing a very large discharge resistor. Note, moreover, that the RC time constant is magnified, by the present invention, only at the time that a long discharge period is wanted, thereby permitting a charge to accumulate very rapidly on capacitor 18 prior to, and for the purpose of causing, tube conduction.

In one circuit which I built and tested, employing 2.5 microsecond pulses at 2500 microsecond intervals, amplifier tube 15 fires on approximately the fourth pulse, i. e., about one-hundredth of a second after application of the first pulse. And, following application of the final pulse of the series, amplifier tube 15 remains in conduction for about 120 seconds. In the circuit referred to, resistor 20 is 20 megohms, capacitor 18 is 3000 micromicrofarads, capacitor 23 is 0.22 microfarad, C− is −6 volts, B+ is +22 volts, and B++ is +80 volts. These values have been shown in Figure 1. The values are, of course, not intended to be limiting; they are merely illustrative.

It was stated previously hereinabove that the rate of discharge of the grid circuit increases substantially when the relay 22 cuts out and capacitor 23 becomes disconnected. This increase in rate of discharge is due, of course, to the fact that the grid-plate interelectrode capacitance of the tube has been substituted for the many-times-larger capacitance of capacitor 23, making the discharge time constant many times shorter.

And, of course, when tube 15 stops conducting, the discharge time constant becomes still shorter, being then equal to the product of $R_{20}$ and $C_{18}$.

It was also indicated previously hereinabove that while contact point *a* of relay 22 is preferably connected to a source of fixed positive voltage, B+, it is not essential that point *a* be so connected. If desired, the source of fixed positive voltage, B+, may be omitted and point *a* not connected to anything. Or, if desired, point *a* may be connected to ground, though this is a less desirable arrangement. It will be understood that at the time switch 24 moves from point *a* to point *b*, it is preferable that the potential of the switch side of capacitor 23 be at least slightly positive relative to cathode in order to insure the grid being driven above zero bias. Then the discharge of the grid circuit will always start at the same fixed point, namely, zero bias. The switch side of capacitor 23 may be given a positive potential, prior to the time that switch 24 is actuated, either by connecting contact point *a* to the source of fixed positive voltage, B+, as is shown in Figure 1, or by not connecting contact point *a* to anything. For, in the latter case, both sides of capacitor 23 would be at or near the positive potential of the plate at the time the relay is actuated. I prefer, however, that the starting potential on the switch side of capacitor 23 be a fixed value, and this is readily accomplished by connecting point *a* to the fixed positive voltage, B+.

As indicated above, the circuit would work in a reasonably satisfactory, though somewhat less desirable, manner if contact point *a* were connected to ground instead of to a positive potential. In this case, however, the discharge period would be subject to possible variation, and may not always be of maximum length, since the grid may not always be as positive as zero bias at the start of the discharge period.

Point *a* should not, of course, be connected to a source of negative potential of such magnitude that the switch side of capacitor 23 acquires a negative potential sufficient to drive the grid of tube 15 below cutoff (or below the potential at which relay 22 cuts out) when switch 24 is moved to point *b*.

In summary, it will be seen that by means of the present invention the effective value of the input capacitance $C_{18}$ is increased, for discharge purposes only, to a value approximately equal to $C_{23}A$, thereby increasing the discharge time constant many times while maintaining a very fast response to incoming trigger pulses.

Having described my invention, I claim:

1. In an electrical system; an amplifier tube having at least triode electrodes; biasing means for rendering said tube normally non-conductive; means responsive to applied pulse signals for rendering said tube conductive, said responsive means comprising a first capacitor and a shunt discharge resistor connected in the input circuit of said tube; and means for maintaining said tube conductive for a relatively long period of time following application of the last of said pulse signals, said last-named means comprising a second capacitor and switching means responsive to current flow in the output circuit of said amplifier tube for connecting said second capacitor between the grid and an output electrode of said tube, whereby the discharge time constant of the input circuit of said tube is substantially increased, being approximately equal to the value of said discharge resistor multiplied by the value of said second capacitor multiplied by the gain of said tube.

2. In an electrical system; an amplifier tube having at least triode electrodes; means biasing said tube beyond cutoff; a first capacitor connected in the input circuit of said tube; a source of time-spaced pulse signals; a discharge resistor connected across said first capacitor; and means for applying at least a portion of said pulses across the input circuit of said tube in such polarity as to cumulate a voltage across said first capacitor which opposes the bias supplied by said biasing means, whereby the net bias on said tube rises above cutoff potential and said tube conducts; and means responsive to current flow in an output circuit of said tube for connecting a second capacitor between an input and an output electrode of said tube and for maintaining said second capacitor so connected, thus to increase the effective input capacitance of said tube to a value approximately equal to that of said second capacitor multiplied by the gain of said tube, whereby the discharge time constant of the input circuit of said tube is substantially increased during the time that said tube is conductive and said second capacitor is connected between said input and output electrodes.

3. In an electrical system; an amplifier tube having at least cathode, grid, and plate electrodes; a source of fixed biasing voltage; means for applying said fixed biasing voltage to the grid-cathode circuit of said tube to bias said tube beyond cutoff; a source of pulse signals; a first capacitor responsive to said pulse signals for cumulating a voltage; means for applying said cumulating voltage to the grid-cathode circuit of said tube in opposition to said fixed biasing voltage, whereby the net bias on said tube is raised above cutoff and said tube conducts; a discharge resistor connected across said first capacitor; and means effective during substantially the period that said tube is conducting for increasing the time required to discharge said first capacitor, said last-named means comprising means responsive to current flow in the plate-cathode circuit of said tube for connecting, and maintaining connected, a second capacitor between the plate and grid electrodes of said tube, said second capacitor being large relative to the grid-plate interelectrode capacitance of said tube.

4. In an electrical system; an amplifier tube having at least cathode, grid and plate electrodes; means biasing said tube beyond cutoff; a first capacitor connected across the grid and cathode of said tube; a source of time-spaced pulse signals; a discharge resistor connected across said first capacitor; means for applying at least a portion of said pulses across said first capacitor in such polarity as to cumulate a voltage which opposes the bias supplied by said biasing means, whereby the net bias on said tube rises above cutoff potential and said tube conducts; a second capacitor; and means responsive to plate current flow for connecting and maintaining connected said second capacitor between the grid and plate electrodes of said tube, thereby to increase substantially the effective input capacitance of said tube during the time that said second capacitor is so connected.

No references cited.